United States Patent [19]

Conrad

[11] Patent Number: 4,756,728
[45] Date of Patent: Jul. 12, 1988

[54] AIR FILTERING DEVICE

[75] Inventor: John R. Conrad, Westlake Village, Calif.

[73] Assignee: William R. Eckstrom, Dolton, Ill.; a part interest

[21] Appl. No.: 87,814

[22] Filed: Aug. 19, 1987

[51] Int. Cl.⁴ .............................................. B01D 46/02
[52] U.S. Cl. ...................................... 55/385 A; 55/467; 55/500; 55/508
[58] Field of Search ................ 55/385 A, 385 B, 467, 55/472, 500, 504, 506, 505, 508

[56] References Cited

U.S. PATENT DOCUMENTS

| 2,057,568 | 3/1936 | Gerard | 183/49 |
| 3,376,695 | 4/1968 | Muckley | 55/505 X |
| 3,861,894 | 1/1975 | Marsh | 55/493 X |
| 4,023,472 | 5/1977 | Grunder et al. | 55/467 X |
| 4,088,463 | 5/1978 | Smith | 55/505 X |
| 4,440,555 | 4/1984 | Chichester | 55/385 B |
| 4,472,184 | 9/1984 | Neumann et al. | 55/493 X |
| 4,549,887 | 10/1985 | Joannou | 55/131 |
| 4,606,260 | 8/1986 | Cox | 55/385 B X |

Primary Examiner—Charles Hart
Attorney, Agent, or Firm—Harpman & Harpman

[57] ABSTRACT

A satellite pre-filter cabinet positions replaceable air filters in an area in which air polluting harmful industrial dusts, including friable asbestos and/or fumes and gases are present and must be removed. The satellite air filter cabinet is connected to negative air pressure devices and filters remotely situated as for example outside of the polluted area.

7 Claims, 1 Drawing Sheet

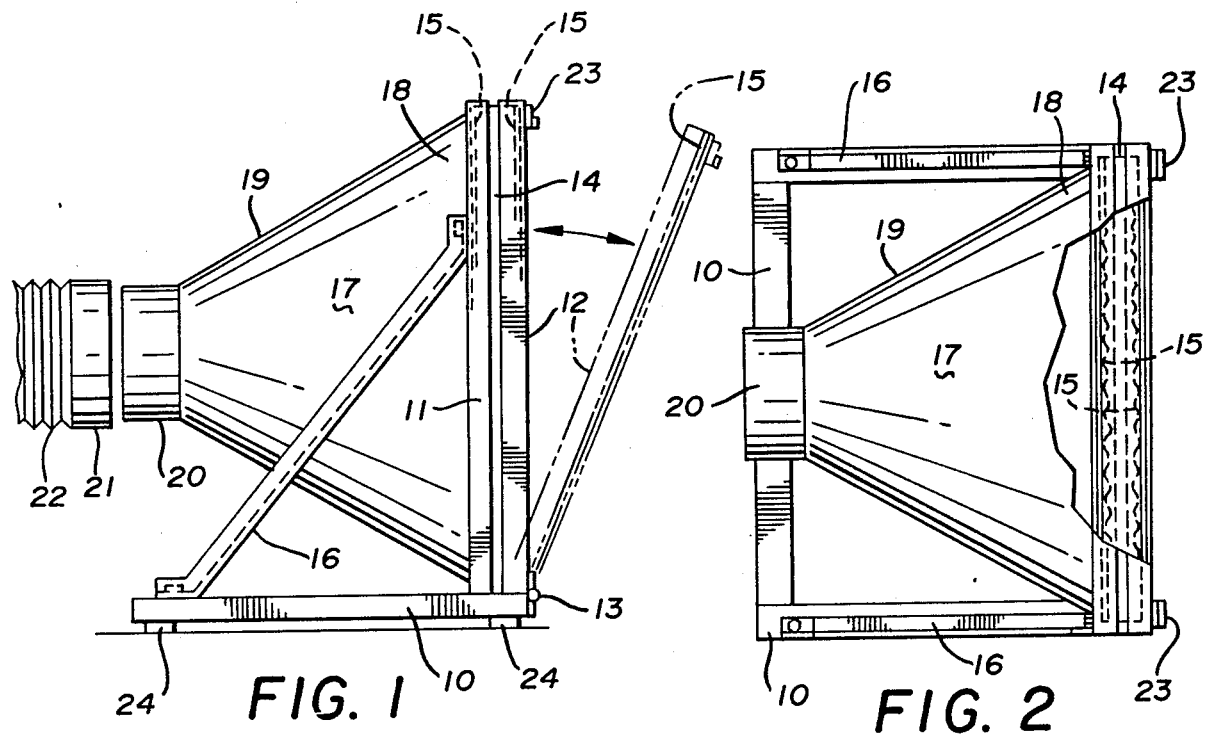
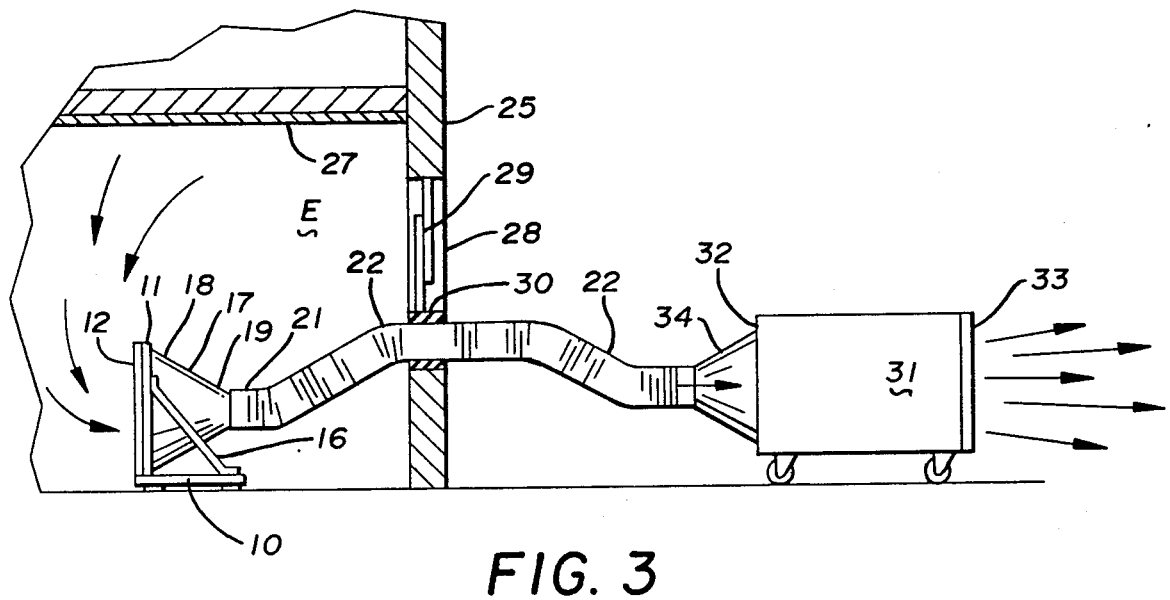

AIR FILTERING DEVICE

BACKGROUND OF THE INVENTION

1. Technical Field

This invention relates to auxiliary air filters useful in so-called clean air systems and negative air pressure systems incorporating HEPA filters in combination with air exhausting machines.

2. Description of Prior Art

U.S. Pat. No. 2,057,568 discloses a dust arrester comprising a pair of screened frames for positioning a filter element in a pipe communicating with a hot air furnace.

U.S. Pat. No. 4,549,887 discloses an electronic air filter in an enclosure provided with a hinged screen positioning air filter elements against another hinged screen.

SUMMARY OF THE INVENTION

The present invention provides a device that will hold an effective replaceable auxiliary air filter element in relation to a funnel-shaped collector which in turn communicates with a flexible hose of relative large diameter extending to a remotely situated air exhausting machine incorporating a powered blower and highly efficient HEPA filters. The device of the present invention enables the replaceable air filter elements to be easily and quickly changed and substantially extending the life of the HEPA filters downstream therefrom.

DESCRIPTION OF THE DRAWINGS

FIG. 1 is a side elevation with parts in broken lines indicating an alternate position of one of the filter positioning frames thereof;

FIG. 2 is a top plan view thereof with parts broken away with broken lines indicating the replaceable air filter elements positioned therein;

FIG. 3 is a plan view with parts in cross-section illustrating an area in a building in which air-borne contaminating materials are present and the portable satellite filter cabinet positioned therein and connected to a negative air machine incorporating HEPA filters positioned exteriorly of the building.

DESCRIPTION OF THE PREFERRED EMBODIMENT

In the form of the invention illustrated herein the satellite filter cabinet comprises a horizontally disposed rectangular base frame formed of front, back and side frame members 10 secured to one another at their ends and supporting a fixed upstanding square frame 11 formed of top, bottom and side members which are cross-sectionally L-shaped and secured to one another at their ends and positioned on the base frame 10 adjacent the front frame member thereof. A secondary upstanding square frame member 12 of a size matching the upstanding square frame member 11 and like the upstanding square frame member 11 formed of cross-sectionally L-shaped members secured to one another at their ends is hinged at its lower edge to the front frame member of the rectangular base frame 10 by hinges 13. The upstanding square frame member 11 and the secondary matching square frame member 12 are arranged in oppositely disposed relation to one another so as to form a frame-like enclosure in which a replaceable air filter element 14 may be positioned and held securely as shown in solid lines in FIGS. 1 and 2 of the drawings. If desired, the upstanding square frame member 11 and the hinged movable frame member 12 may be provided with wide mesh screens 15 to insure the positioning of the replaceable air filter element 14 or alternately filter units such as available commercially in which the filter elements are positioned between apertured metallic sheets may be employed. In order that the upstanding square frame 11 and the movable square frame 12 which form the mounting for the replaceable air filter element 14 will stand the effects of partial vacuum when the device is in use a pair of angular braces 16 are provided and extend between the rectangular base frame 10 and the upstanding square frame 11 and are secured thereto by suitable fasteners. A funnel-shaped housing 17 having a squared large end 18 and a circular small end 19 is mounted between the angular braces 16. The square large end being attached to the backside of the upstanding square frame 11, as for example by being provided with a peripheral flange engageable in the cross-sectionally L-shaped members forming the upstanding square frame 11 and secured thereto by riveting, welding or replaceable fasteners as desired. The smaller circular end 19 of the funnel-shaped housing 17 is provided with an annular collar 20 having an outer diameter of at least 12 inches so that an annular end 21 of a flexible air conducting hose 22 of the non-collapseable type can be slip fit thereover to establish communication therewith. The hinges 13 heretofore referred to as movably mounting the secondary movable square frame member 12 are preferably spring hinges normally urging the secondary square frame member 12 toward the fixed upstanding square frame member 11. In order to insure the positioning of the replaceable air filter element 14 in the frame so formed, fasteners 23 are provided on the upper portion of the secondary square frame member 12 for securing the same to the upstanding square frame 11. The fasteners are preferably of a type that are manually moved from fastening to non-fastening position. As illustrated in FIGS. 1 and 3 of the drawings, the rectangular base frame 10 is provided with rubber feet 24 which may be bolted thereto or otherwise affixed. By referring now to FIG. 3 of the drawings, an enclosure E comprising an area in which air polluting materials are present, such as for example friable asbestos filaments, is formed by a structure including walls 25, a floor 26 and a ceiling 27 with a window opening 28 and double hung window sash 29 therein. The lower portion of the window opening 28 being provided with an apertured closure 30 through which the flexible air hose 22 is positioned. As illustrated, the satellite filter cabinet here-in-before described and incorporating the replaceable filter holding frames 11 and 12 on the base 10 and the funnel-shaped housing 17 are shown with the collar 20 engaged in the annular end 21 of the flexible air hose 22. Still referring to FIG. 3 of the drawings, it will be seen that the flexible air hose 22 extends through the apertured closure 30 and outwardly of the enclosure defined by the structure illustrated and communicates with a negative air pressure machine 31, such as the "RED BARON" machine available from Global Consumer Services, Inc. of Los Angeles, Calif. The negative air pressure machine incorporates an HEPA filter and a powerful blower driven by an electric motor which creates a desireable air flow through the device from its inlet end 32 to it outlet 33. The inlet end 32 is equipped with a funnel-shaped housing 34 similar to the funnel-shaped housing 17 here-in-before described in connection with the satellite filter cabinet and to which the flexible air conducting hose 22 is attached. Directional arrows in FIG. 3 of the drawings indicate the air movement created by the negative air pressure machine 31 and illustrate the portability of the satelllite filter cabinet which can be easily moved about in the enclosure E. Those skilled in the art will observe that friable asbestos filiments and other dangerous industrial dust will be initially collected by the satellite filter cabinet disclosed herein by the replaceable air filter element 14 which may be easily and quickly replaced.

It will also be observed that the satellite filter cabinet herein disclosed is relatively lightweight as compared with the negative air pressure machines previously used in enclosed areas in which harmful air-borne pollutants are present and/or being removed as for example in the removal of asbestos containing ceilings, and pipe and duct insulating materials. It is believed that the many advantages of the satellite filter cabinet formed in accordance with the present invention will be readily understood and although a preferred embodiment of the device has been illustrated and described, changes in the details of construction and in the combination and arrangement of parts may be resorted to which will fall within the scope of the invention as claimed and, having thus described my invention, what I claim is:

1. A portable satellite air filtering device for use with a negative air pressure machine having a primary air filter therein comprises a horizontally disposed base frame having front, back and side frame members, an upstanding fixed frame on said front frame member, said fixed frame having upper, lower and side frame members defining an area on one side thereof in which a replaceable air filter element is removably positioned, a secondary upstanding frame movably attached to said front frame member in spaced relation to said fixed frame for movement toward and away from said fixed frame and said replaceable air filter element, funnel means on the other side of said fixed frame and above said base frame in communication with said fixed frame and a flexible air conducting hose detachably connected to said funnel means and to and in communication with said negative air pressure machine and said primary air filter wherey said replaceable air filter element in said satellite air filtering device prefilters air flowing to said primary filter and negative air pressure machine.

2. The portable satellite air filtering device set forth in claim 1 and wherein said upstanding fixed frame comprises upper, lower and side frame members of cross sectionally L-shape positioned so as to be able to receive and hold said replaceable air filter element therein.

3. The portable satellite air filtering device set forth in claim 1 and wherein said upstanding fixed frame and said secondary upstanding frame each comprise upper, lower and side frame members of cross sectionally L-shape positioned in oppositely disposed relation to one another defining said area on said one side of said upstanding fixed frame in which said replaceable air filter element is removably positioned.

4. The portable satellite air filtering device set forth in claim 1 and wherein said upstanding fixed frame is vertically positioned on said base frame above said front frame member thereof and said funnel means in communication with said upstanding fixed frame is positioned rearwardly thereof substantially above said base frame.

5. The portable satellite air filtering device set forth in claim 1 and wherein said upstanding fixed frame is positioned on said base frame adjacent said front frame member thereof and said funnel means in communication with said upstanding fixed frame is positioned rearwardly thereof substantially above said base frame, and wherein said secondary upstanding frame is movable from a first position adjacent said upstanding fixed frame to a second position outwardly thereof in a direction opposite to said funnel means.

6. The portable satellite air filtering device set forth in claim 4 and wherein braces are positioned between said base frame and said upstanding fixed frame on angles relative thereto.

7. The portable satellite air filtering device set forth in claim 1 and wherein said secondary upstanding frame comprises upper, lower and side frame members defining an area on one side thereof in which said replaceable air filter element is removably positioned and wherein spring hinges connect and position said lower frame members of the upstanding fixed frame and the lower frame members of said secondary upstanding frame so that said secondary upstanding frame is movable toward and away from said upstanding fixed frame on an arc based on said spring hinges.

* * * * *